United States Patent
Kuehnle et al.

(10) Patent No.: US 11,958,425 B2
(45) Date of Patent: Apr. 16, 2024

(54) SYSTEM AND METHOD FOR CONTROLLING A DRIVER FACING CAMERA

(71) Applicant: Bendix Commercial Vehicle Systems LLC, Elyria, OH (US)

(72) Inventors: Andreas U Kuehnle, Villa Park, CA (US); Karl H Jones, Fullerton, CA (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 115 days.

(21) Appl. No.: 17/316,783

(22) Filed: May 11, 2021

(65) Prior Publication Data

US 2022/0363212 A1 Nov. 17, 2022

(51) Int. Cl.
*H04N 7/18* (2006.01)
*B60R 11/04* (2006.01)
*B60R 21/015* (2006.01)
*H04N 1/21* (2006.01)

(52) U.S. Cl.
CPC ........ *B60R 21/01538* (2014.10); *B60R 11/04* (2013.01); *H04N 1/2129* (2013.01); *B60W 2420/42* (2013.01)

(58) Field of Classification Search
CPC ... B60R 11/04; H04N 1/2129; B60W 2420/42
See application file for complete search history.

(56) References Cited

U.S. PATENT DOCUMENTS

| | | | |
|---|---|---|---|
| 2002/0067076 A1* | 6/2002 | Talbot | B60R 11/04 307/10.1 |
| 2018/0278896 A1* | 9/2018 | Schimelpfenig | H04N 5/76 |
| 2021/0245662 A1* | 8/2021 | Blank | B60R 1/081 |
| 2021/0370879 A1* | 12/2021 | Julian | H04L 67/06 |

\* cited by examiner

*Primary Examiner* — Patrick E Demosky
(74) *Attorney, Agent, or Firm* — Brian E. Kondas; Cheryl L. Greenly; Eugene E. Clair (57) ABSTRACT

A control device for a recorder in an associated vehicle includes a processor and an input port operatively coupled with the processor. The input port receives a parking brake status signal comprising parking brake data representative of a parking brake status. A non-transient memory device is operatively coupled with the processor. The non-transient memory device stores parking brake status data representative of whether the parking brake is engaged. Control logic stored in the non-transient memory device is executable by the processor to: determine a parking brake status as engaged based on the parking brake data. An output port is operatively coupled with the processor. The output port transmits a recording control signal enabling the recording based on the determined parking brake status.

17 Claims, 5 Drawing Sheets

SYSTEM AND METHOD FOR CONTROLLING A DRIVER FACING CAMERA

BACKGROUND

The present invention relates to recording a driver in a vehicle. It finds particular application in conjunction with recording the driver while respecting the driver's privacy and will be described with particular reference thereto. It will be appreciated, however, that the invention is also amenable to other applications.

With advances in technology, it is now feasible and cost-effective to record images inside a vehicle and, furthermore, to wirelessly transmit those images to a remote location. One use of this technology is to review an accident to identify actions and behavior of people in the vehicle before the accident occurred.

In some situations, the driver is an employee hired to drive the vehicle. Privacy issues arise when recording images of such employees. For example, it may be acceptable to record an employee while performing tasks required by the employer. But, it may be unacceptable and/or unlawful to continue recording the employee while on a break.

The present invention provides a new and improved apparatus and method which addresses the above-referenced problems.

SUMMARY

In one aspect of the present invention, it is contemplated that a control device for a recorder in an associated vehicle includes a processor and an input port operatively coupled with the processor. The input port receives a parking brake status signal comprising parking brake data representative of a parking brake status. A non-transient memory device is operatively coupled with the processor. The non-transient memory device stores parking brake status data representative of whether the parking brake is engaged. Control logic stored in the non-transient memory device is executable by the processor to: determine a parking brake status as engaged based on the parking brake data. An output port is operatively coupled with the processor. The output port transmits a recording control signal enabling the recording based on the determined parking brake status.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
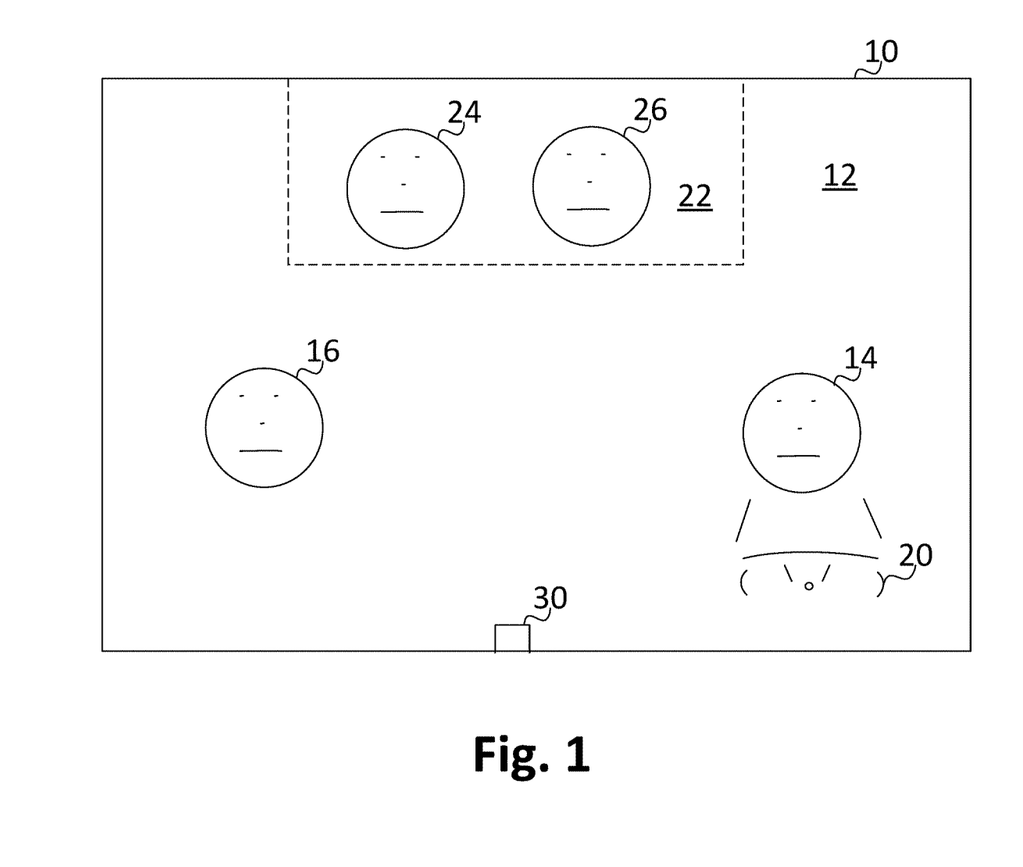
FIG. 1 illustrates a view of an inside cab of a vehicle with a recording system in accordance with one embodiment illustrating principles of the present invention.

With reference to FIG. 1, a vehicle 10 includes an interior 12 (e.g., an inside or interior cab) and at least one (1) person 14, 16 in the interior 12. In the illustrated embodiment, the person 14 is an operator (e.g., driver) of the vehicle, and the person 16 is a passenger in the vehicle 10. Although two (2) persons 14, 16 are illustrated in FIG. 1, it is to be understood any number of passengers is contemplated. A vehicle steering wheel 20 and a bunk area 22 (e.g., a sleeping or additional seating area) behind the driver and passenger seats are also illustrated inside the interior cab 12. Two (2) additional persons 24, 26 are illustrated in the bunk area 22.

An image capturing device 30 (e.g., a camera, which in one embodiment is referred to as a driver facing camera (DFC)) is positioned to take images of the at least one person 14, 16. Although the camera 30 is illustrated inside the interior cab 12, it is also contemplated to be outside of the interior cab 12.

Figure 2:
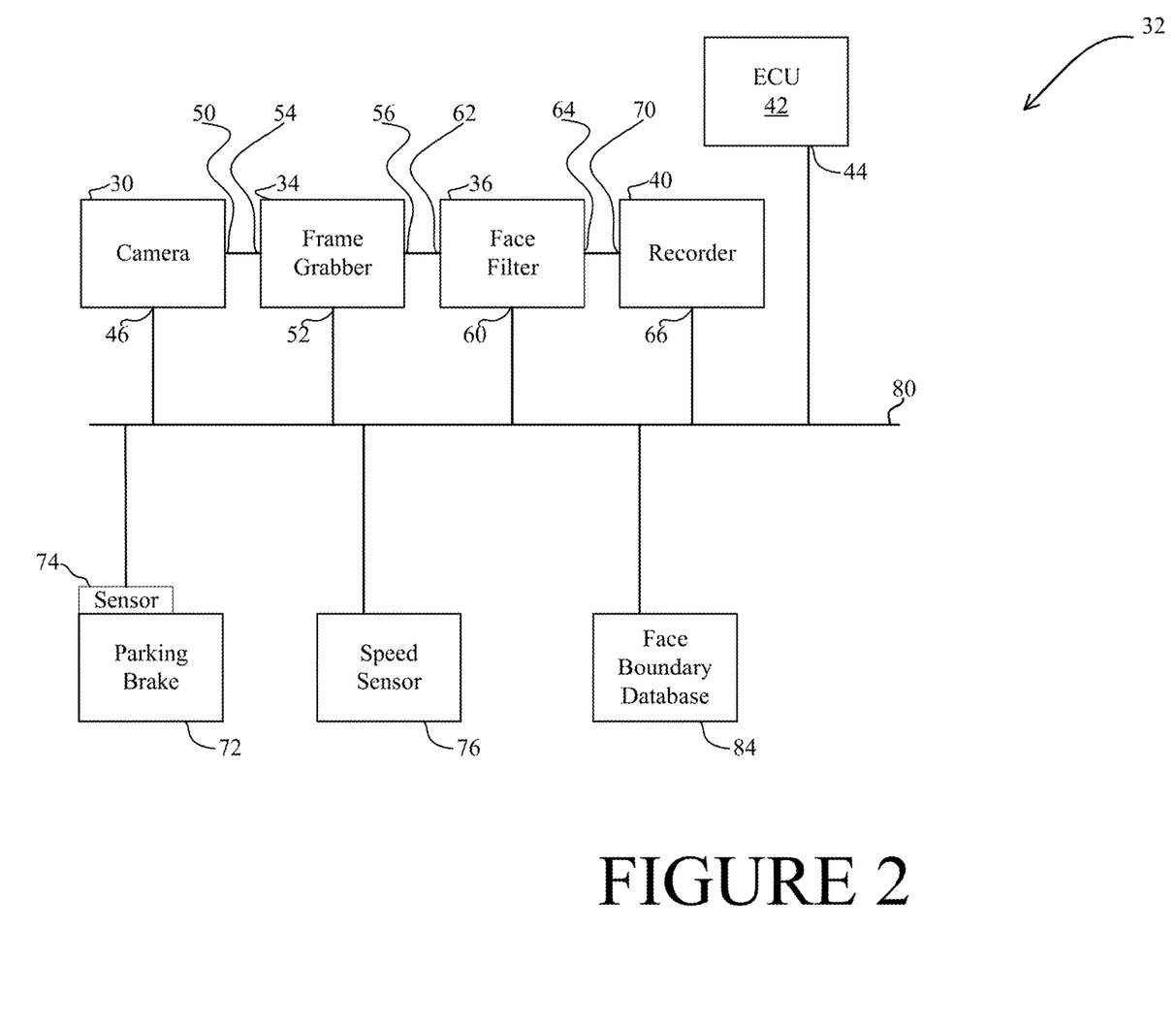
FIG. 2 illustrates a component representation of a vehicle with a recording system in accordance with one embodiment illustrating principles of the present invention.

With reference to FIG. 2, an exemplary diagram of a recording system 32 is illustrated in accordance with one embodiment of the present invention. The recording system 32 includes the camera 30, a frame grabber 34, a face filter 36, a recorder 40, and a controller 42 (e.g., an electronic control unit (ECU)). The ECU 42 includes, and/or is operatively coupled with, a non-transient memory device, which stores parking brake status data representative of whether the parking brake is engaged. Control logic is stored in the ECU 42 (e.g., in the non-transient memory device), and is executable by a processor in the ECU 42.

The ECU 42 includes an electrical ECU communication port 44. The camera 30 includes an electrical control input port 46 and an electrical data output port 50. The frame grabber 34 includes a frame grabber electrical control input port 52, a frame grabber electrical data input port 54, which electrically communicates with the camera data output port 50, and a frame grabber electrical data output port 56. The face filter 36 includes a face filter electrical control input port 60, a face filter electrical data input port 62, which electrically communicates with the frame grabber data output port 56, and a face filter electrical data output port 64. The recorder 40 includes a recorder electrical control input port 66 and a recorder electrical data output port 70, which electrically communicates with the face filter data output port 64.

The system 32 also includes a parking brake 72, which is set to either an engaged state or a disengaged state by the driver 14. A parking brake sensor 74 senses the state of the parking brake 72. A vehicle speed sensor 76 senses a speed of the vehicle 10.

In the illustrated embodiment, a vehicle data bus 80 (e.g., a J1939 data bus) electrically communicates with the ECU communication port 44, the camera control port 46, the frame grabber control port 52, the face filter control port 60, the recorder control port 66, the park brake sensor 74 and the vehicle speed sensor 76 for transmitting messages between the ECU 42, the camera 30, the frame grabber 34, the face filter 36, the recorder 40, the park brake sensor 74 and the vehicle speed sensor 76. Other embodiments, in which the ECU 42, the camera 30, the frame grabber 34, the face filter 36, the recorder 40, the park brake sensor 74 and the vehicle speed sensor 76 transmit messages via direct electrical connections between each other, are also contemplated. Although the illustrated embodiment includes a wired data bus 80, other embodiments including wireless communications are also contemplated.

Figure 3:
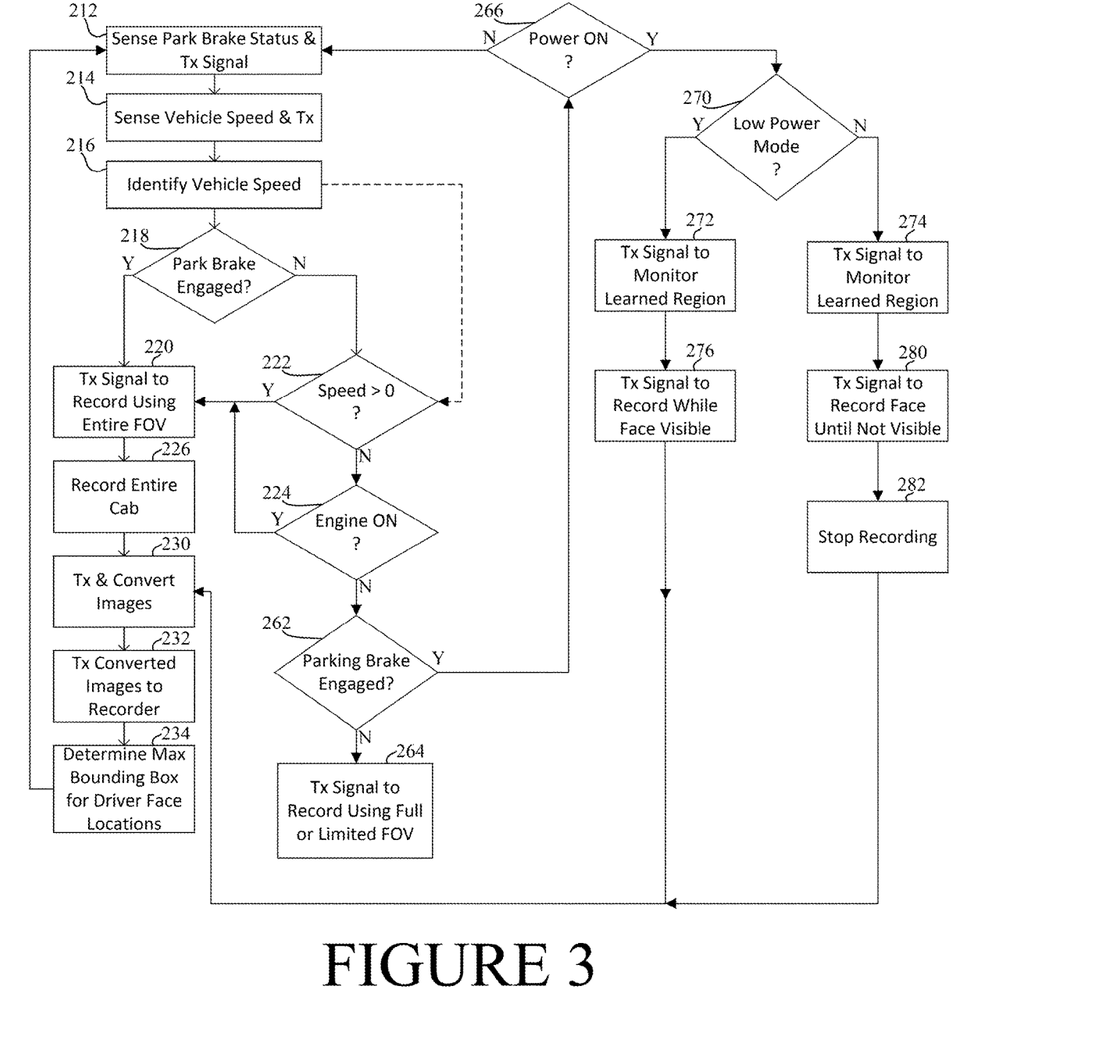
FIG. 3 is an exemplary methodology of recording the inside cab of the vehicle in accordance with one embodiment illustrating principles of the present invention.

With reference to FIG. 3, an exemplary methodology of the system shown in FIGS. 1 and 2 for controlling the recording system 32 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

During use, the parking brake sensor 74 senses, in a step 212, the state of the parking brake 72 (e.g., whether the parking brake 72 is in the engaged state or the disengaged state) and transmits, via the bus 80, an electrical parking brake state signal to the ECU 42. In a step 214, the vehicle speed sensor 76 senses a speed of the vehicle 10 and transmits, via the bus 80, a vehicle speed signal to the ECU 42.

In a step 216, the ECU 42 identifies the speed of the vehicle 10, based on the vehicle speed signal. In an optional step 218, a determination is made whether the parking brake 72 is engaged/disengaged based on the parking brake state signal. If it is determined in the optional step 218 that the parking brake 72 is engaged, control passes to a step 220; the step 220, along with subsequent steps that occur after the step 220, are discussed below. If it is determined in the optional step 218 that the parking brake 72 is disengaged, control passes to a step 222.

If the optional step 218 is not performed, control passes from the step 216 to the step 222 as indicated by the dashed line from the step 216 to the step 222. In the step 222, a determination is made if the speed of the vehicle 10 is greater than zero (0) mph (e.g., is the vehicle 10 is moving). If it is determined in the step 222 that the vehicle 10 is moving, control passes to the step 220; otherwise, if it is determined in the step 222 that the vehicle 10 is not moving (e.g., stationary), control passes to a step 224.

In the step 220 (e.g., MOVING), the ECU 42 transmits a signal to the camera 30 to record images of the interior cab 12 using an entire field-of-view (FOV) of the camera 30. By recording images of the interior cab 12 using the entire field-of-view (FOV) of the camera 30, substantially the entire interior cab 12 including the bunk area 22 is recorded in a step 226. In a step 230, the recorded images are transmitted from the camera 30 to the frame grabber 34, where the images are converted to a standard video signal, such as NTSC, or compressed to H.264. Then, in a step 232, the converted images are transmitted from the frame grabber 34 to the recorder 40 where the images are stored.

Figure 4:
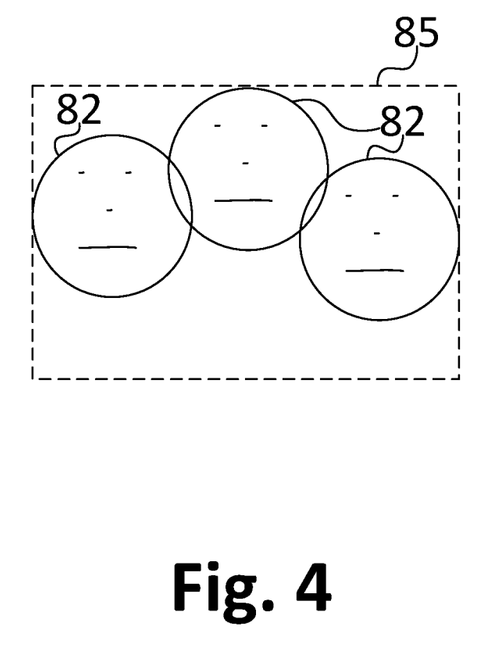
FIG. 4 illustrates an exemplary bounding box defined by outermost bounds of drivers' faces.
Figure 5:
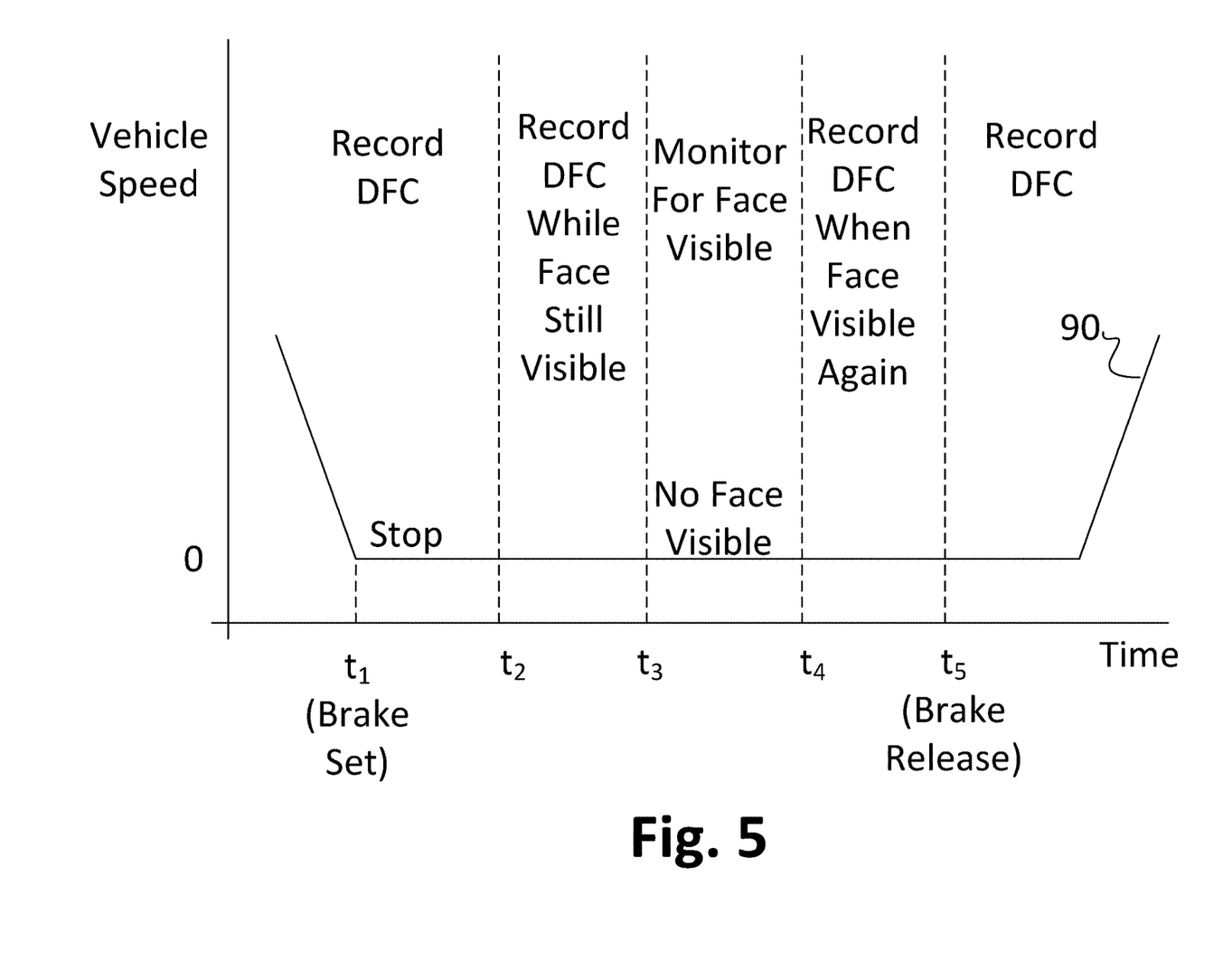
FIG. 5 is a graph of vehicle speed vs. time illustrating when a camera records/monitors a learned region in accordance with one embodiment of the present invention.

In a step 234, the ECU 42 evaluates the data representing the images stored in the recorder 40 to identify locations within the camera's 30 FOV where a face 82 of the driver 14 has been identified (e.g., to determine a maximum bounding box for driver face location(s)). A face boundary database 84 (e.g., a non-volatile memory), which electrically communicates with the ECU 42 via, for example, the data bus 80, identifies spatial boundaries in the interior cab 12 where all drivers' faces have been captured by the camera 30 while the vehicle 10 has been moving. With reference to FIG. 4, a region 85 (e.g., a substantially rectangular region) defined by the outermost (e.g., maximum) bounds of all the views of a driver's face 82 captured by the camera 30 while the vehicle 10 has been moving is referred to as a learned region (e.g., a bounding box). By learning the image boundaries of where faces may be located, computation in later facial detection computations is saved (e.g., 'you don't need to look here').

In other embodiments, it is also contemplated that the face boundary database 84 identifies spatial boundaries, typically as row and column minima and maxima, in the interior cab 12 where only the driver's face 82 (e.g., the current driver's face) has been captured by the camera 30 while the vehicle 10 has been moving. In that case, the substantially rectangular learned region 85 is defined by the outermost bounds of the current driver's face 82 captured by the camera 30 while the vehicle 10 has been moving, either during the current trip or during all trips when the driver 14 has operated the vehicle 10 while it has been moving. Control then returns to the step 212. Hysteresis ensures the occasional missed detection does not lead to gaps in the recording. The purpose of the recording system is to record the actions of the driver at relevant times. That is, a driver (e.g., a face visible in the driver's area) and the appropriate circumstances (e.g., parking brake not set) that indicate recording should occur are required. If a recording occurrence is predicated when a face is visible in the driver's area, then the occasional missed face detection at that location will lead to gaps in the recording. Such gaps are avoided by requiring a face to not be seen for some number of frames ('persistently not visible'), while maintaining the recording until that number of frames is reached. Similarly, a face be required to be visible for some (probably smaller) number of frames before recording is started again. This minimum count and persistence mechanism-hysteresis-produces coherent, gap- and flicker-free recordings.

As discussed above, if it is determined in the step 222 that the vehicle 10 is stationary (e.g., NOT MOVING), control passes to the step 224. In the step 224, a state of an engine 86 of the vehicle 10 is determined (e.g., whether the engine is ON or OFF). If the engine is determined to be ON in the step 224 (e.g., ENG ON), control passes to the step 220 so the ECU 42 transmits a signal to the camera 30 to record images of the interior cab 12 using an entire field-of-view (FOV) of the camera 30. As discussed above, control then passes from the step 220 to the step 226, etc.

If the engine is determined to be OFF in the step 224, control passes to a step 262 (e.g., ENG OFF). In the step 262, the status of the parking brake 72 (e.g., engaged or disengaged) is determined from the parking brake signal received from the parking brake sensor 74. If the status of the parking brake 72 is determined to be disengaged in the step 262, control passes to a step 264; otherwise, if the status of the parking brake 72 is determined to be engaged in the step 262, control passes to a step 266.

In the step 264, the ECU 42 transmits a signal to the camera 30 to record images of the interior cab 12 using the entire FOV of the camera 30 or, alternatively, a limited FOV. For example, a limited FOV may view a portion of the cab interior 12 that does not include the bunk area 22 A limited field of view will typically angularly constrain what is recorded or visible in the recording. For instance, one might only record what is visible in the learned region 85 where the driver's head has been and so likely may be located again, rejecting the other portions of the image. Control then returns to the step 226 to record before passing to the step 230, etc.

In the step 266, a determination is made whether system power (e.g., auxiliary power for powering a radio, lights, etc. in the cab 12) is ON or OFF? If it is determined in the step 266 that the system power is OFF, no recording is done, and control then returns to the step 212. Otherwise, if it is determined in the step 266 that the system power is ON, a determination is made, in a step 270 whether the system power is in a low power mode. In one embodiment, the lower power mode is defined when only the camera 30 and a small ECU associated with the camera 30 are on—the small ECU monitors for register changes in the camera 30 indicating that the area containing a face has changed; if a persistent change happens, the (relatively larger) ECU 42 is awoken from its sleep mode to record again. If it is determined in the step 270 that the system power is in the low power mode, control passes to a step 272; otherwise, if it is determined in the step 270 that the system power is not in the low power mode control passes to a step 274.

In the step 272 (e.g., Low Power Mode), the ECU 42 transmits a signal to the camera 30 to monitor the learned region 85. Then, in a step 276, the ECU 42 transmits a signal to the camera 30 to record while a face is visible in the learned region 85 until a predetermined time (e.g., 30 seconds) after the face is no longer visible in the learned region 85. In one embodiment, the recording during the low power mode is done at the same frame rate snapshot as is done when not in the low power mode. Alternatively, in another embodiment, the recording during the low power mode is a limited recording during which the recording is limited to a relatively lower frame rate snapshot (e.g., one frame per second) and/or reduced recording area. For example, a reduced area inside the cab 12 may include only an area inside the cab 12 where the driver 14 and optionally the passenger 16 sit. Such a reduced recording area provides increased privacy to the bunk area 22 and, optionally, the passenger area. Control then passes to the step 230.

It is contemplated that monitoring (e.g., monitoring of the driver seat) may be done in at least two ways. The first way is to look for a face in the detection area (e.g., the learned region 85), which typically requires calculations by the ECU 42. The second way is to define a content sensitive area in the image using the learned face detection area (e.g., the learned region 85), and then monitor for significant, persistent, gain and exposure changes induced by changes in this area. That is, a face is not explicitly required to be visible; instead, the content sensitive area is monitored for changes that would be produced by a face being present. Many imagers have the ability to set the weighting for where is used to adjust exposure settings, and we may set this area to correspond to the learned face detection area 85 from above. That is, an approximate matched filter may be created for the face using imager weighting, and thus be partially immune to non-face disturbances in the learned face detection area 85. The approximate matched filter is the average image in the monitored area while a driver is known to be present (e.g., such as when the vehicle is moving).

In the step 274 (e.g., Not Low Power Mode), the ECU 42 transmits a signal to the camera 30 to monitor the learned region 85. Then, in a step 280, the ECU 42 transmits a signal to the camera 30 to record while the face is visible in the learned region 85 and continue to monitor the learned region 85 until the face is no longer visible. Then, in a step 282, the ECU 42 transmits a signal to the camera 30 to stop recording when the face is no longer visible in the learned region 85. Control then passes to the step 230.

Although the ECU 42 is described above as a separate component from the face filter 36 and recorder 40, other embodiments, in which the ECU 42, the face filter 36 and recorder 40 are incorporated into a single unit, are also contemplated. In such other embodiments, the recorder 40 only accepts images with a face visible That way, the state of the parking brake 72 acts as a single trigger for controlling the camera 30 and/or the camera video frame grabber 34. For example, the camera 30 and/or the camera video frame grabber 34 are set to record when the parking brake 72 is disengaged, and the camera 30 and/or the camera video frame grabber 34 are set to not record when the parking brake 72 is engaged.

One point of deciding whether or not to record is whether there is a face visible in the image. The face filter 36 either controls the recording (e.g., seeing a face means the recorder is ON); or it could mean that the camera and frame grabber always produce signals, which are then filtered by the face filter 36, hence constraining recording to only video with a face visible.

With reference to FIGS. 1-5, a graph 90 of vehicle speed vs. time illustrates when the camera 30 records/monitors the learned region 85 in accordance with one embodiment of the present invention. With reference to the graph 90, the vehicle 10 stops (e.g., has a speed of zero (0)) at a time $t_1$. Prior to the time $t_1$, it is assumed the camera 30 is recording the learned region 85. When the vehicle 10 stops at the time $t_1$, the camera 30 continues to record while a face is still visible in the learned region 85 at a time $t_2$ and until a face is no longer visible in the learned region 85 at a time $t_3$. Then, at the time $t_3$, when the face is no longer visible in the learned region 85, the camera 30 monitors the learned region 85 until a face again becomes visible in the learned region 85 at a time $t_4$. The camera 30 continues to record the learned region 85 at a time $t_5$ when the parking brake 72 is released.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A control device for a recorder in an associated vehicle, the control device comprising:
    a processor;
    an input port operatively coupled with the processor, the input port receiving a parking brake status signal comprising parking brake data representative of a parking brake status;
    a non-transient memory device operatively coupled with the processor, the non-transient memory device storing parking brake status data representative of whether the parking brake is engaged;
    control logic stored in the non-transient memory device, the control logic being executable by the processor to:
        determine a parking brake status as engaged based on the parking brake data;

determine a status of auxiliary power of the associated vehicle;
when the status of the auxiliary power is determined to be off, the control logic determines to not record the interior cab of the vehicle; and
when the status of the auxiliary power is determined to be on, the control logic determines when the auxiliary power of the associated vehicle is in a low power mode, and when the auxiliary power of the associated vehicle is in the low power mode, the control logic determines to transmit, via the output port, a signal to monitor a learned region in the interior cab of the vehicle using the associated camera; and
an output port operatively coupled with the processor, the output port transmitting a recording control signal enabling the recording based on the determined parking brake status and the auxiliary power.

2. The control device as set forth in claim 1, wherein:
when the parking brake status is determined to be engaged, the control logic determines to transmit, via the output port, the recorder control signal to turn the recorder OFF.

3. The control device as set forth in claim 1, wherein:
the control logic determines when a speed of the associated vehicle is above a predetermined speed threshold; and
when the control logic determines the speed of the associated vehicle is above the predetermined speed threshold, the control logic determines to transmit, via the output port, a signal to record an interior cab of the vehicle using an entire field of view of an associated camera.

4. The control device as set forth in claim 3, wherein:
when the control logic determines the speed of the associated vehicle is not above the predetermined speed threshold, the control logic determines a status of an engine of the associated vehicle; and
when the control logic determines the status of the engine is on, the control logic determines to transmit, via the output port, a signal to record the interior cab of the vehicle using the entire field of view of an associated camera.

5. The control device as set forth in claim 4, wherein when the control logic determines the status of the engine is off:
when the parking brake status is determined to be disengaged, the control logic determines to transmit, via the output port, the recorder control signal to activate the recorder to record the interior cab of the vehicle using the entire or a limited field of view of the associated camera.

6. The control device as set forth in claim 1, wherein while monitoring the learned region using the associated camera:
the control logic determines when a face is present in the learned region; and
when a face is present in the learned region, the control logic determines to transmit, via the output port, a signal to record the learned region using the associated camera.

7. The control device as set forth in claim 6, wherein while recording the learned region using the associated camera:
the control logic determines when the face is no longer present in the learned region; and
when the face is no longer present in the learned region, the control logic determines to transmit, via the output port, a signal to stop recording the learned region.

8. A method for controlling a recorder in an associated vehicle, the method comprising:
receiving a parking brake status signal, via an input port operatively coupled with a processor, representative of a status of a parking brake on the associated vehicle;
storing parking brake status data, representative of the status of the parking brake, in a non-transient memory device operatively coupled with the processor;
identifying the status of the parking brake, based on the parking brake status data, as one of engaged and disengaged;
determining a status of auxiliary power of the associated vehicle;
when the status of the auxiliary power is determined to be off, determining to not record the interior cab of the vehicle; and
when the status of the auxiliary power is determined to be on:
determining when the auxiliary power of the associated vehicle is in a low power mode; and
when the auxiliary power of the associated vehicle is in the low power mode, transmitting, via the output port, a signal to monitor a learned region in the interior cab of the vehicle using the associated camera; and
transmitting a recorder control signal, via an output port operatively coupled with the processor, activating the recorder based on the determined parking brake status and the auxiliary power.

9. The method for controlling a recorder as set forth in claim 8, wherein:
when the parking brake status is determined to be engaged, transmitting the recorder control signal to activate the recorder.

10. The method for controlling a recorder as set forth in claim 8, wherein:
determining when a speed of the associated vehicle is above a predetermined speed threshold; and
when the speed of the associated vehicle is above the predetermined speed threshold, transmitting, via the output port, a signal to record an interior cab of the vehicle using an entire field of view of an associated camera.

11. The method for controlling a recorder as set forth in claim 10, wherein:
when the speed of the associated vehicle is not above the predetermined speed threshold, determining a status of an engine of the associated vehicle; and
when the status of the engine is on, transmitting, via the output port, a signal to record the interior cab of the vehicle using the entire field of view of an associated camera.

12. The method for controlling a recorder as set forth in claim 11, wherein when the control logic determines the status of the engine is off:
when the parking brake status is determined to be disengaged, transmitting, via the output port, a signal to record the interior cab of the vehicle using the entire or a limited field of view of the associated camera.

13. The method for controlling a recorder as set forth in claim 12, wherein when the control logic determines the status of the engine is off:
when the parking brake status is determined to be disengaged, transmitting, via the output port, a signal to record the interior cab of the vehicle using the limited field of view of the associated camera including a driver.

14. A method for controlling a recorder in an associated vehicle, the method comprising:

receiving a parking brake status signal, via an input port operatively coupled with a processor, representative of a status of a parking brake on the associated vehicle;

storing parking brake status data, representative of the status of the parking brake, in a non-transient memory device operatively coupled with the processor;

identifying the status of the parking brake, based on the parking brake status data, as one of engaged and disengaged;

transmitting, via an output port operatively coupled with a processor, a signal to monitor a learned region in the interior cab of the vehicle using the associated camera;

determining when a face is present in the learned region; and when a face is present in the learned region and based on the determined parking brake status, transmitting, via the output port, a recorder control signal activating the recorder to record the learned region using the associated camera.

15. The method for controlling a recorder as set forth in claim 14, wherein while recording the learned region using the associated camera:

determining when the face is no longer present in the learned region; and when the face is no longer present in the learned region, transmitting, via the output port, a signal to stop recording the learned region.

16. A control device for a recorder in an associated vehicle, the control device comprising:

a processing means;

an input port operatively coupled with the processing means, the input port receiving a parking brake status signal based on a status of a parking brake on the associated vehicle;

a memory means operatively coupled with the processing means, the memory means storing parking brake status data representative of the parking brake status and monitoring a learned region in the interior cab of the associated vehicle;

control logic stored in the memory means, the control logic being executable by the processing means to determine:

the status of the parking brake, as one of engaged and disengaged, based on the parking brake status data; and a status of auxiliary power of the associated vehicle;

when the status of the auxiliary power is determined to be off, the control logic determines to not record the interior cab of the vehicle;

when the status of the auxiliary power is determined to be on, the control logic determines when the auxiliary power of the associated vehicle is in a low power mode, and when the auxiliary power of the associated vehicle is in the low power mode, the control logic determines to transmit, via the output port, a signal to monitor a learned region in the interior cab of the vehicle using the associated camera; and an output port operatively coupled with the processing means, the output port transmitting a recorder control signal activating the recorder based on the determined parking brake status and the determined auxiliary power status.

17. The control device for a recorder in an associated vehicle as set forth in claim 16, wherein:

when the parking brake status is determined to be engaged, the control logic determines to transmit, via the output port, the recorder control signal to activate the recorder.

* * * * *